US010372838B2

(12) United States Patent
Lindberg et al.

(10) Patent No.: US 10,372,838 B2
(45) Date of Patent: Aug. 6, 2019

(54) AUTOMATED PREFABRICATED WALL FRAME ASSEMBLY

(71) Applicants: Hannu Lindberg, Fremont, CA (US); Skip Miyamoto, Los Gatos, CA (US); Zachary Charles Murphy, Redwood City, CA (US)

(72) Inventors: Hannu Lindberg, Fremont, CA (US); Skip Miyamoto, Los Gatos, CA (US); Zachary Charles Murphy, Redwood City, CA (US)

(73) Assignee: DPR CONSTRUCTION, INC., Redwood City, VA (US)

( * ) Notice: Subject to any disclaimer, the term of this patent is extended or adjusted under 35 U.S.C. 154(b) by 807 days.

(21) Appl. No.: 14/150,234

(22) Filed: Jan. 8, 2014

(65) Prior Publication Data

US 2015/0193561 A1    Jul. 9, 2015

(51) Int. Cl.
*G06G 7/48* (2006.01)
*G06F 17/50* (2006.01)

(52) U.S. Cl.
CPC ...... *G06F 17/5004* (2013.01); *G06F 2217/02* (2013.01)

(58) Field of Classification Search
None
See application file for complete search history.

(56) References Cited

U.S. PATENT DOCUMENTS

| | | | | |
|---|---|---|---|---|
| 6,295,513 B1 * | 9/2001 | Thackston | ......... | G05B 19/4099 703/1 |
| 2004/0237439 A1 * | 12/2004 | Powell | ...................... | E04B 1/20 52/505 |
| 2006/0075718 A1 * | 4/2006 | Borne | .................... | G06Q 10/06 52/745.02 |
| 2008/0082183 A1 * | 4/2008 | Judge | .................... | G05B 15/02 700/33 |
| 2008/0249756 A1 * | 10/2008 | Chaisuparasmikul | ...................... | G06F 17/5004 703/13 |
| 2011/0054652 A1 * | 3/2011 | Heil | ................... | G05B 19/4097 700/98 |

OTHER PUBLICATIONS

Hergunsel, Mehmet F. Benefits of building information modeling for construction managers and BIM based scheduling. Diss. Worcester Polytechnic Institute, 2011.*

* cited by examiner

*Primary Examiner* — Aniss Chad
*Assistant Examiner* — Nithya J. Moll
(74) *Attorney, Agent, or Firm* — Kilpatrick Townsend & Stockton LLP

(57) ABSTRACT

A method for generating a three-dimensional model of a building includes providing a processor, receiving an indication from a user for a two-dimensional path for a wall, and retrieving parameters for the wall from a database. The method also includes determining that part of the wall may be constructed using a prefabricated component and preparing, using the parameters for the wall and the path for the wall, a model for the prefabricated component for use in construction of the wall. The method further includes preparing, using the processor, a three-dimensional model of the wall using the two-dimensional path, the parameters for the wall and the model for the prefabricated component and adding the three-dimensional model of the wall to a model of a building.

14 Claims, 8 Drawing Sheets

AUTOMATED PREFABRICATED WALL FRAME ASSEMBLY

BACKGROUND OF THE INVENTION

A number of elements in construction projects can be prefabricated off-site and be brought to the construction site in finished or near-finished form. Currently, a number of larger modules are manufactured off site, such as bathrooms, or significant portions of bathrooms, staircases and office units. Designing these prefabricated components can be more complex than designing a building. A prefabricated component is more useful if it can be produced in large numbers, and it is therefore important to design a components that can be used in multiple sites on a single construction project, or a module that may be used on multiple different construction sites.

Embodiments of the present invention include methods for automatically designing a prefabricated component, or automatically selecting prefabricated components for portions of a construction project.

SUMMARY OF THE INVENTION

Embodiments of the present invention include a method for generating a three-dimensional model of a building. The method may include providing a computer having a processor. The method may also include receiving an indication from a user for a two-dimensional path for a wall. The method may further include retrieving parameters for the wall from a database; and determining that part of the wall may be constructed using a prefabricated component. The method may include using the parameters for the wall and the path for the wall to prepare a model for a prefabricated component for use in construction of the wall. Furthermore, the method may include preparing a three-dimensional model of the wall using the two-dimensional path, the parameters for the wall and the model for the prefabricated component; the three-dimensional model of the wall may then be added to a model of a building.

In embodiments of the invention parameters for the wall may include wall thickness, wall height, wall materials and/or insulation type.

In further embodiments of the invention, preparing a three-dimensional model of the wall may include ensuring that there are no conflicts between MEP components and studs.

Embodiments of the invention may include receiving parameters for the wall from the model of the building, and coordinating MEP components in the wall with MEP components in the model of the building. Further embodiments of the invention include preparing models of mechanical electrical and plumbing components inside the prefabricated component in conjunction with preparing a model for the prefabricated component. Yet other embodiments also include preparing models of electrical wiring inside the wall when preparing a three-dimensional model of the wall. In embodiments of the invention, preparing a three-dimensional model of the wall includes preparing models of electrical outlets and air vents.

Embodiments of the present invention include a method for generating a three-dimensional model of a building including providing a computer having a processor. The method may include receiving an indication from a user for a two-dimensional path for a wall. The method may further include retrieving parameters for the wall from a database. Furthermore, the method may include determining that part of the wall may be constructed using a prefabricated component and retrieving a model for the prefabricated component for use in construction of the wall from a database. The method may also include preparing a three-dimensional model of the wall using the two-dimensional path, the parameters for the wall and the model for the prefabricated component and adding the three-dimensional model of the wall to a model of a building.

Embodiments of the present invention may include a non-transitory computer-readable storage medium including a plurality of computer-readable instructions tangibly embodied on the computer-readable storage medium, such that when the instructions are executed by a data processor, a three-dimensional model of a building is provided. The instructions include instructions that cause the data processor to receive an indication from a user for a two-dimensional path for a wall. The instructions may further include instructions for retrieving parameters for the wall from a database and instructions for retrieving information about at least one prefabricated component from a component library. The instructions may further include instructions for preparing a three-dimensional model of the wall using the two-dimensional path and the parameters for the wall, such that the three-dimensional model includes the information about the at least one prefabricated component. The instructions may further include instructions that cause the data processor to add the three-dimensional model of the wall to a model of a building.

An embodiment of the invention includes a system for preparing a three-dimensional model of a building. The system may include a computer having a processor; and a memory disposed in communication with the processor. Executable instructions, may be stored in the memory, including instructions for receiving an indication from a user for a two-dimensional path for a wall. The instructions may further include instructions for retrieving parameters for the wall from a database; and retrieving information about at least one prefabricated component from a component library. The instructions may also include preparing a three-dimensional model of the wall using the two-dimensional path and the parameters for the wall, wherein the three-dimensional model include the information about the at least one prefabricated component. The instructions may finally include adding the three-dimensional model of the wall to a model of a building.

DETAILED DESCRIPTION OF THE INVENTION

Embodiments of the present invention include a method for generating a three-dimensional model of a building. The method may include providing a computer having a processor. The computer may be a desktop or laptop computer, or may be any other type of computing device, such as a tablet computer, or mobile phone. The computer may further be connected to a computing network and communicate with one or more servers over the computing network to access additional databases and/or additional processing power.

The method may be used to design a custom prefabricated component or to select existing or predesigned prefabricated components for a construction project. The method may be used to design a number of different parts of a construction project, including walls, stairwells, roofs, ceilings, MEP systems and bathrooms. The method is not limited to the examples recited herein, and the method may be used with any aspect of a construction project.

Figure 1:
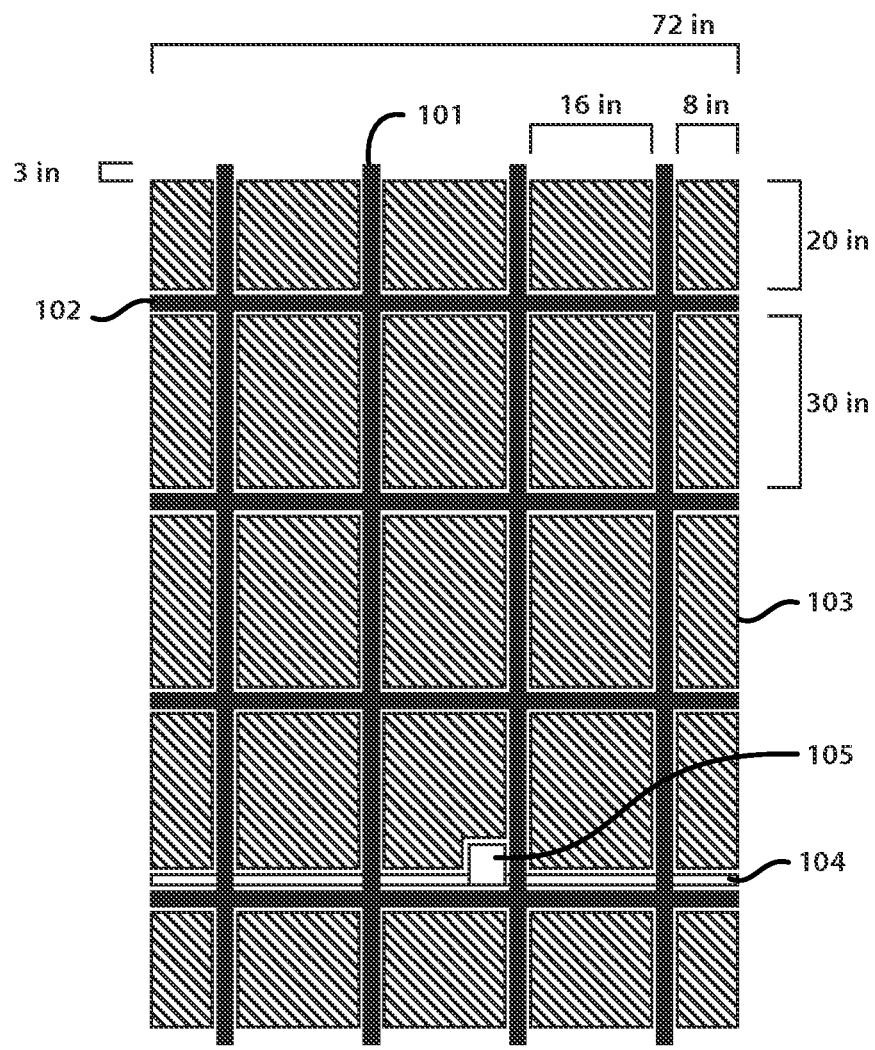
FIG. 1 shows a prefabricated component for a section of a wall designed according to an embodiment of the invention.
Figure 2:
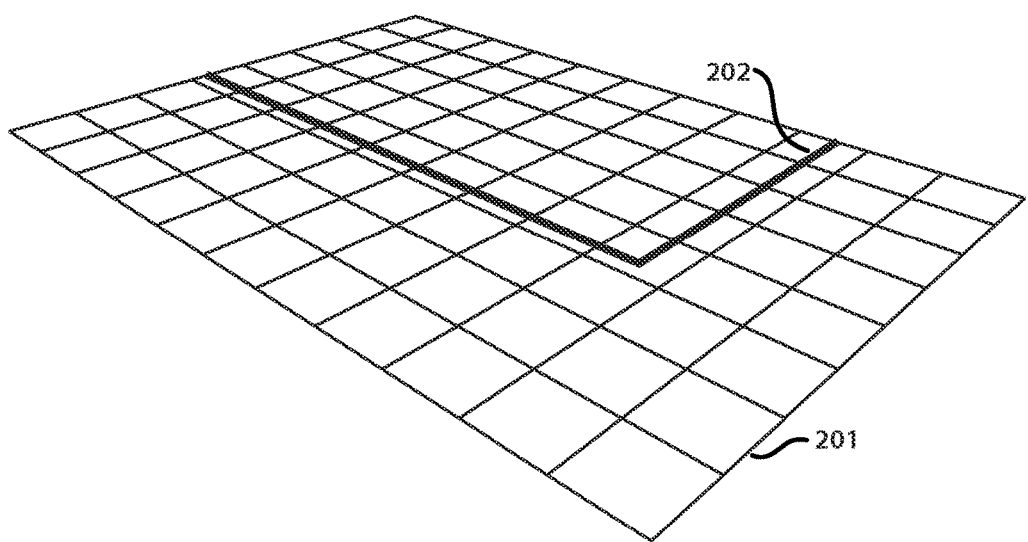
FIG. 2 shows a path for a wall drawn on a floor plane according to an embodiment of the invention.

In an embodiment of the invention, a prefabricated component for making a wall is designed. An example of such a prefabricated component is shown in FIG. 1. As can be seen in FIG. 1, the prefabricated component is made of four vertical studs (101) and four horizontal studs (102). The spacing between vertical studs is 16 inches, and the spacing between horizontal studs is 30 inches. The distance from each vertical stud and the edge is 8 inches half the vertical stud spacing. The prefabricated component also includes a duct for electrical wiring (103) and an electrical box (105). The component also includes insulation (103) placed in the space between the studs. At the top of the prefabricated component, the vertical studs extend 23 inches above the topmost horizontal stud, and insulation extends 20 inches above the topmost horizontal stud, leaving 3 inches of clear studs at the top with no insulation for attaching to the building. A similar arrangement can be seen at the bottom. The method may include receiving an indication from a user for a two dimensional path for a wall. An example of a two-dimensional path drawn on a floor plane is shown in FIG. 2. The user may give this indication using a computer aided design (CAD) application, such as Autodesk Autocad, or any other similar tool. In other embodiments, custom software may be used that feeds into a design workflow or library. The two dimensional path may be given in relation to an existing model of a building or an incomplete building, or may be given in relation to an allocated space. The allocated space may be space allocated for construction of a structure such as a building or a ship. The allocated space may also be space in an unidentified structure yet to be determined. The two dimensional path may identify the path that the wall should take. For example a user may select a starting point and an ending point for the wall, and the path indicated may be the straight line between the two points. In another embodiment, the user may be able to use multiple points and a straight path may be selected between the points in the order they were input. In yet another embodiment of the invention Bezier curves may be used to allow for curved or complex paths. A person skilled in the art will appreciate that there are a number of ways of selecting a two dimensional path and that the examples recited above do not limit the scope of the present invention. FIG. 2 shows a two dimensional path (202) for a wall on a floor plane (201).

The path may be input using a mouse, a drawing board, such as a Wacom Intuos board. or any other input device. In an embodiment of the invention where a tablet computer is used a user may be able to input information about the path using finger or hand gestures. In another embodiment of the invention, a user may be able to input parameters for the path using textual input by giving coordinates of the various points that define the path. In yet another embodiment of the invention the user may be able to select a file with information about the path and use that as a starting point. The invention is not limited to the examples recited above, and any means of inputting the data may be used.

Figure 3:
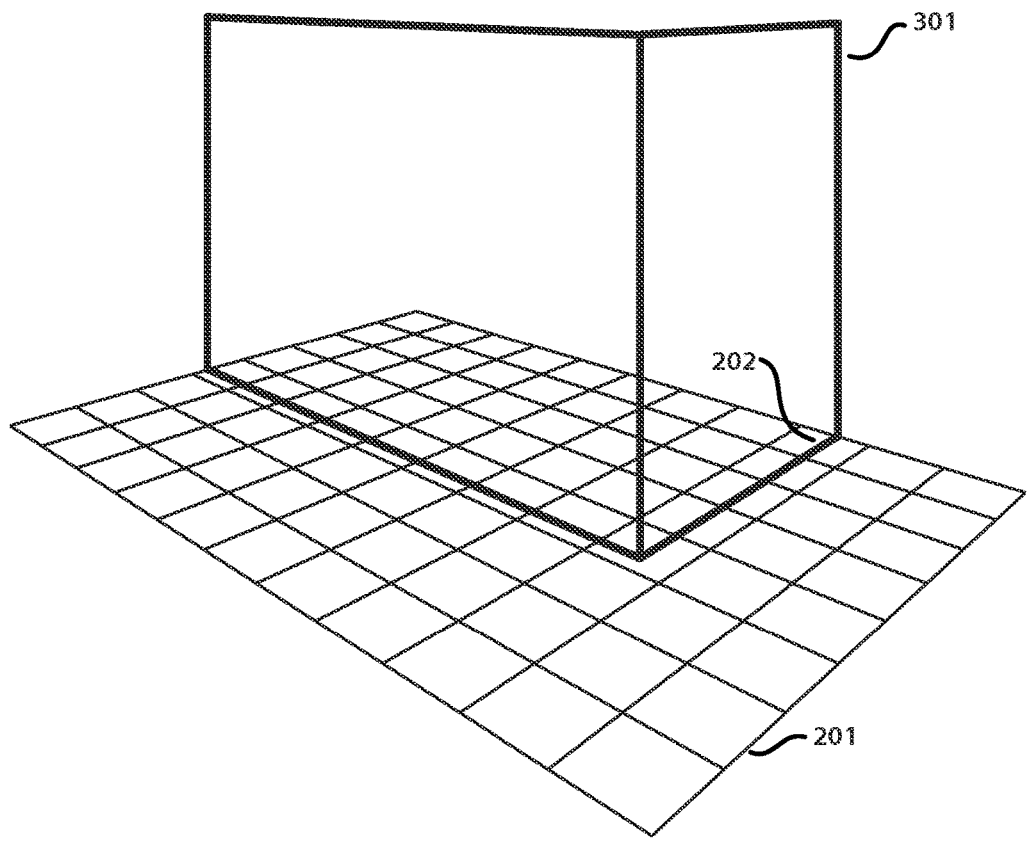
FIG. 3 shows a three dimensional outline for a wall on a floor plane according to an embodiment of the invention.

The method may further include retrieving parameters for the wall from a database. These parameters may include wall thickness, wall material choices, and other properties such as what components to embed in the wall. These components may include electrical wiring and outlets, ductwork and other components. In an embodiment of the invention, the parameters relate to local and national code requirements. For example fire regulations or other regulations may dictate that a wall may have a certain thickness or be made from certain materials. Furthermore, a construction project may have implemented its own guidelines, such as the use of only steel studs of a certain quality and a particular stud spacing. Other examples include the use of certain types of dry-wall or the inclusion of certain types of MEP components in the wall, or inclusion of certain types of heat and/or sound insulation in the wall. FIG. 3 shows a three dimensional outline (301) for a wall on a floor plane (201), including an indication of the height of the wall.

Based on the path, and the received parameters of the wall, it may be determined that at least a part of the wall may be constructed using a prefabricated component. The (prefabricated component may be a segment of the wall; for example a 6 ft wide segment of the wall. Furthermore, the method may include using the parameters for the wall and the path for the wall to prepare a model for a prefabricated component for use in construction of the wall.

In one embodiment of the invention, a model of the entire wall is generated, and then analyzed to determine if the wall may be constructed using a prefabricated component. If it can be produced using a prefabricated component, a model for a component to be prefabricated may be produced. The model may be produced by analyzing the structure of the wall to determine an optimal size for the component as well as the number of components that can be included in the wall. For example, a straight wall measuring 30 ft may be drawn wherein the wall connects two other walls and includes a 5 ft wide door beginning 10 ft. from one end of the wall. A 5 ft wide prefabricated wall element may be used to construct the wall using 5 elements and a doorframe. If the door is moved to be 11 ft from one end of the wall, 4 prefabricated elements may be used, and a 1 ft segment and a 4 ft segment may have to be constructed on each side of the door. Conversely if the door is located 12 ft from one end of the wall, 4 prefabricated 6 ft segments may be used with a 1 ft segment on one side of the door. In an embodiment of the invention the software may indicate that a slightly modified placement of an item such as a window or door may optimize the ability to use prefabricated components. In further embodiments of the invention, multiple different sized wall elements may be used. For example a 5 ft and a 6 ft prefabricated element may be used in combination. Furthermore, a larger item than a single wall may be analyzed to determine the optimal prefabricated components. For example, walls for an entire building or a part of a building may be drawn and modeled before they are analyzed for the ability to use prefabricated components in their construction. In this analysis a user or architect may be alerted of small possible changes to optimize the use of such components, such as minor adjustments to the positioning of doors, windows and power outlets.

Figure 4:
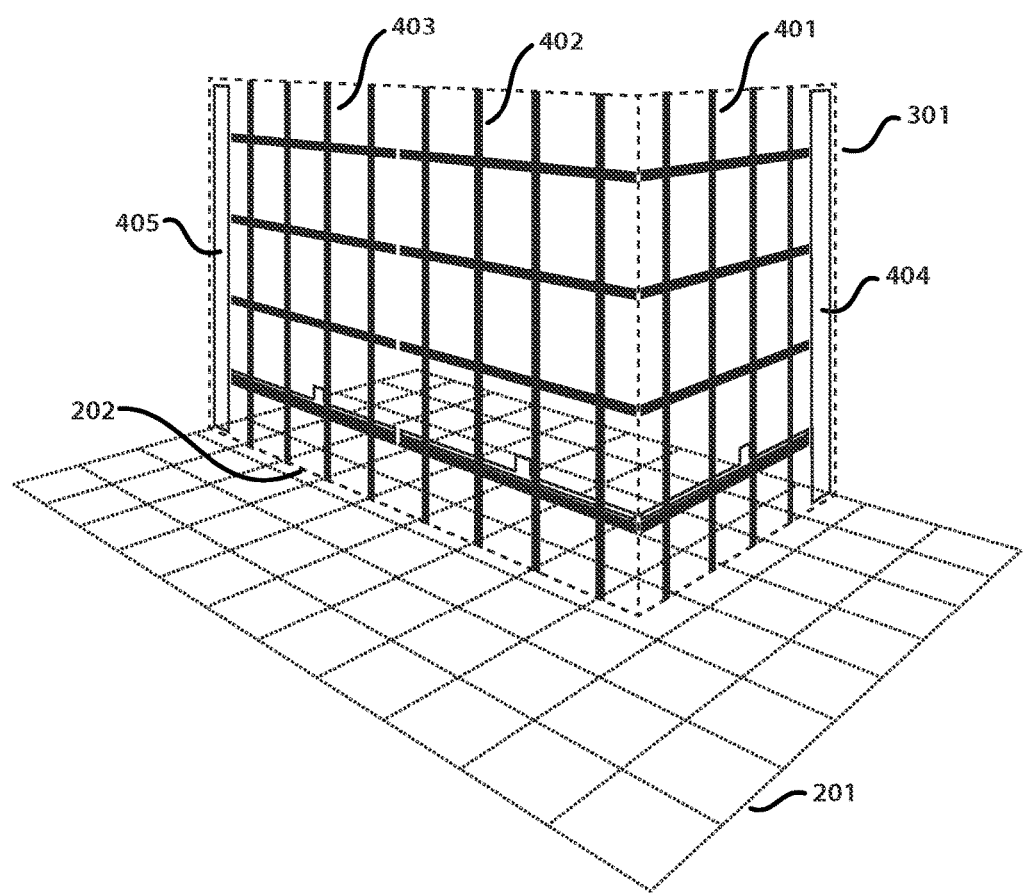
FIG. 4 shows three prefabricated components for wall sections placed inside a three dimensional outline for a wall according to an embodiment of the invention.

FIG. 4 shows three prefabricated wall elements used to generate a model for a wall The figure shows the first element (401), the second element (402) and the third element (403). The elements are shown inside the three dimensional outline of the wall (301). As can be seen, the wall cannot be constructed in its entirety from an integer number of prefabricated wall elements, and two sections (405) and (404) are not constructed using prefabricated wall elements.

FIG. 1 shows an example of a prefabricated wall element. The diagram shows vertical studs (101), horizontal studs (102), insulation (103), a cable duct (104) and a wiring box (105). As can be seen, the element is 72 inches wide, with 16 inch spacing between 2 inch wide studs; the space between the edge and the first stud is 8 inches. The insulation at the top is shortened so 3 inches of bare stud is exposed.

Furthermore, the spacing between studs in a wall may impact the optimal size of prefabricated wall segments. For example it may be optimal to have the width of a prefabricated wall segment be a whole number multiple of the stud spacing wherein the first stud in the prefabricated component is one-half of the stud spacing from the edge of the component. For example if 16-inch stud spacing is used with 2 inch studs, it may be optimal to use a prefabricated component width of 54 inches (4.5 ft) or 72 inches (6 ft) width. If a 54 inch component is used, the first stud may be placed 8 inches from the edge, the next stud, 16 inches from the first one (26 inches from the edge) and the third stud 44 inches from the first edge. When two of these components are joined the stud spacing would remain a uniform 16 inches. When analysis is done for a number of walls or for an entire building, stud spacing may be determined to enable optimal use of prefabricated components. The stud spacing may be limited by local and national regulations, structural properties of the studs use and structural features of other parts of the building. These properties may also feed into the decision on what stud spacing to use and the properties of the studs to use such as material, thickness and quality.

The prefabricated components may furthermore contain basic MEP components such as wiring ducts, HVAC ducts and water pipes or ducts for water pipes. They may also have a channel or area dedicated for such component installation. For example there may be a duct across the bottom of the prefabricated component 10 inches from the floor of a sufficient size to carry electrical wiring and other components. The duct may also be prewired for certain systems with connectors at the edges of the prefabricated component. For example electricity and Ethernet wires may be pre-installed with snap on connectors at each end. In another embodiment, the duct may be empty such that the required wiring can be installed at a later time. Where inspection of the interior of the wall is required at a later time, dry-wall or other covering may be installed on one side of the prefabricated component such that the interior space can be easily accessed. Where such internal inspection is not required, dry wall or other covering may be installed on both sides of the wall component. Space at the bottom and top may be left covered on one or both sides to facilitate attaching the studs to the remainder of the building structure.

The invention is not limited to the various types of embedded components recited above, and a person skilled in the art will appreciate that embodiments of the invention may be used with any type of embedded component or structure.

In an embodiment of the invention, a large number of different prefabricated components may be designed, wherein some are produced in large quantities, whereas others may be produced individually for installation at a particular point. While it may be more efficient to minimize the number of different prefabricated components it may be more efficient to produce certain parts off-site, and a component may be very similar with minor modifications such that the minor modifications do not cause significant complexity in the prefabrication process.

An algorithm may be used by assigning a weight or cost to the number of different types of prefabricated components or by assigning a cost based on the number of each prefabricated component is required. For example a cost of 100 may be assigned to a unique component, whereas a cost of 200 may be assigned for 20 identical components. A person skilled in the art will appreciate that a range of possible algorithms may be used for this type of optimization and that the invention is not limited to the examples recited above.

In one embodiment of the invention, prefabricated wall elements may be attached by sliding them into a track and affixing them with screws, nails or other fasteners. In other embodiments, the may be placed appropriately without a track. Prefabricated wall elements may be ceiling height, full height or any other relevant height. Elements may be built to hold differing types of loads. In one embodiments, a wall element may be very lightweight, and carry only its own weight, and possibly lightweight lighting fixtures. Other embodiments may include walls that can carry heavy equipment such as televisions or wall-affixed toilets. Yet another embodiment may include a full-height wall segment that can support the structure above it. For example, such wall segments may be installed at the time of construction of the building and form an integral part of the overall building structure.

In addition to walls, a number of other components may be constructed in a similar manner. For example, when a building is constructed with a number of identical or similar floors the same method may be used to construct columns of bathrooms wherein the bathrooms are located in the same place on each floor. The bathrooms may each be produced as a prefabricated component with MEP components pre-installed. The MEP infrastructure may be designed such that connections between the bathrooms on each floor align for easy connection. Furthermore, wall covering on the inside may be pre-manufactured as well. Where required, wall covering on the outer walls may be left off to enable inspection of the MEP infrastructure. A similar approach may be applied to a staircase, where a user may indicate a starting floor and an end floor. The computer model of the remainder of the building may include information about the required capacity of the staircase and a database of local regulations and project preferences may include information about material choices. The computer may then compile a model of the entire staircase and determine whether parts of it can be encompassed by the use of prefabricated components and design those components. For example, it may be possible to use segments of 20 steps prefabricated off site.

Once the prefabricated component has been determined, the original model of the wall or other structure may be updated to include references to the use of the prefabricated components. in embodiments of the invention where a model was not compiled prior to selecting prefabricated components, a model of the wall or other structure may be compiled using the model of the prefabricated components and the other components needed in the design.

Figure 5:
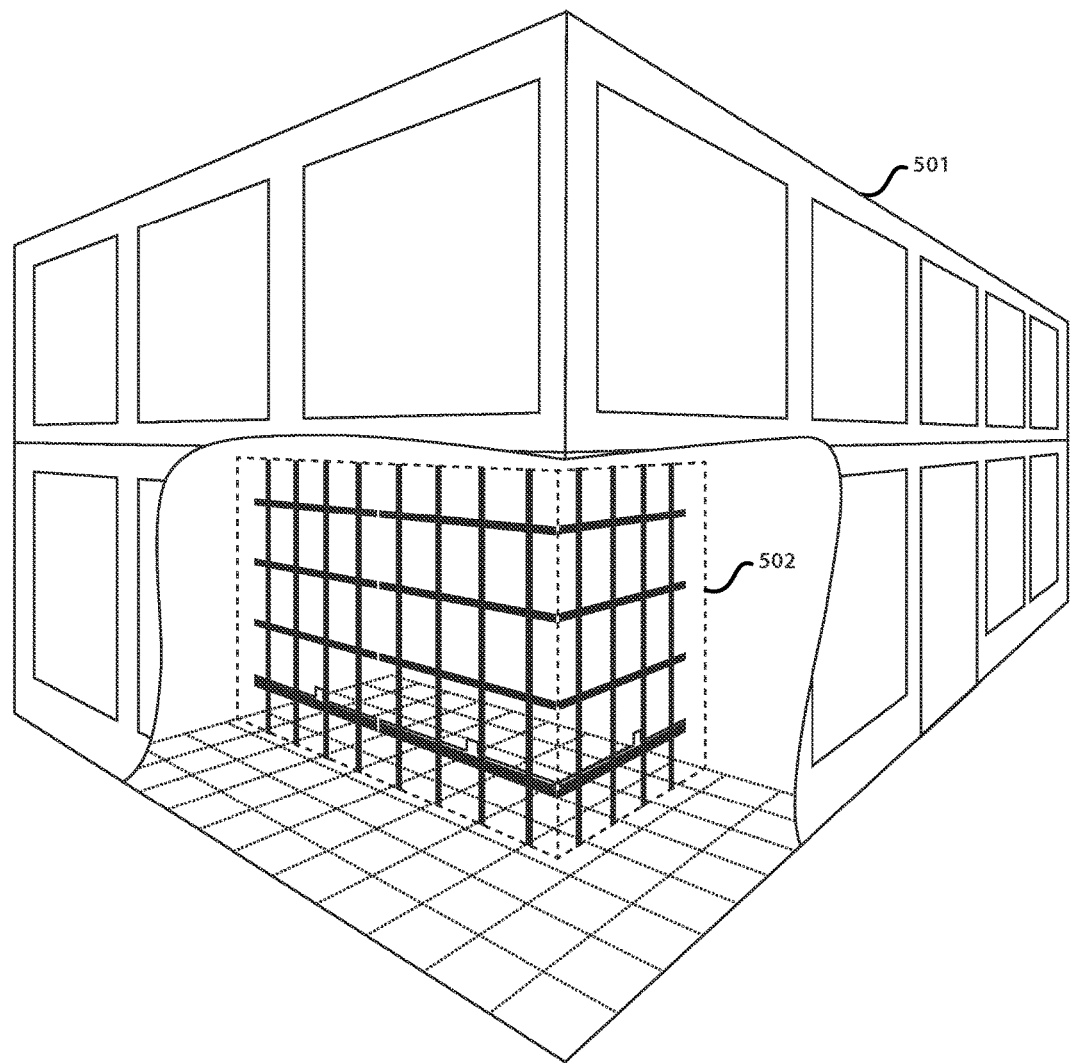
FIG. 5 shows three dimensional model for a wall placed in a three dimensional model for a building according to an embodiment of the invention.

Finally, this model of the wall or other structure may be added to a larger model of the building. Many existing computer software suites support the use of custom sub-components such as Autodesk Autocad. FIG. 5 shows a three dimensional model of a wall (502) embedded in a three dimensional model of a budding (501).

In embodiments of the invention parameters for the wall may include wall thickness, wall height, wall materials and/or insulation type. For example a certain type of sound insulation may be specified. In an embodiment of the invention, certain walls may require heating insulation whereas other walls may require sound insulation. It may be that certain sound insulation materials also provide heating insulation but are more expensive than standard heating insulation materials. However, it may be possible to reduce the number of different prefabricated components by only using sound-insulated prefabricated components. By computing the added cost of having separate components and the added cost of using sound-insulating materials in both walls, the cost of the project may be optimized by selecting the less expensive overall solution. Other types of similar cost assessments may be implemented. It may for example be cheaper to use higher quality studs in places where they are not needed if it substantially reduces the number of different prefabricated components needed, or to use a narrower stud spacing in the entire building to achieve an overall cost savings even though more studs would be used overall.

In further embodiments of the invention, preparing a three-dimensional model of the wall may include ensuring that there are no conflicts between MEP components and studs and that there is space available for the components necessary. This may include preparing a model of MEP components and detecting any potential conflicts between structures in the prefabricated components and the MEP components. For example it may be difficult to route HVAC ducts through the prefabricated components if certain space in the components is allocated for cabling ducts or other purposes. These conflicts may be identified and resolved by either rerouting the HVAC components or modifying the prefabricated components. In embodiments of the invention this may include designing single-instance prefabricated components for certain detected conflicts or determining not to use a prefabricated component for a certain section of the construction project.

Embodiments of the invention may include receiving parameters for the wall from the model of the building, and coordinating MEP components in the wall with MEP components in the model of the building. Further embodiments of the invention include preparing models of mechanical electrical and plumbing components inside the prefabricated component when preparing a model for the prefabricated component. For example, where prefabricated components are identified before the MEP system is designed, they may be updated with additional MEP components if it is determined that it may be efficient to include certain MEP components in the prefabricated wall segment or other prefabricated structures. Yet other embodiments also include preparing models of electrical wiring inside the wall when preparing a three-dimensional model of the wall. in embodiments of the invention, preparing a three-dimensional model of the wall includes preparing models of electrical outlets and air vents. A person skilled in the art will appreciate that the invention is not limited to the examples recited above and that a number of iterations may be used and that any type of structure to be included the building may be included in a (prefabricated component or may be accommodated in the prefabricated components.

Embodiments of the present invention include a method for generating a three-dimensional model of a building including providing a computer having a processor. The computer may be any type of computer including a desktop or laptop computer. A tablet computer or mobile phone may also be used. In other embodiments a distributed computer or computer network may be used. The method may include receiving an indication from a user for a two-dimensional path for a wall. The method may further include retrieving parameters for the wall from a database. Furthermore, the method may include determining that part of the wall may be constructed using a prefabricated component and retrieving a model for the prefabricated. component for use in construction of the wall from a database. The method may also include preparing a three-dimensional model of the wall using the two-dimensional path, the parameters for the wall and the model for the prefabricated component and adding the three-dimensional model of the wall to a model of a building.

Embodiments of the present invention may include a non-transitory computer-readable storage medium including a plurality of computer-readable instructions tangibly embodied on the computer-readable storage medium, such that when the instructions are executed by a data processor, a three-dimensional model of a building is provided. These instructions may be stored on a media such as a hard drive, flash memory or any other non-transitory computer readable medium. The instructions include instructions that cause the data processor to receive an indication from a user for a two-dimensional path for a wall. The instructions may further include instructions for retrieving parameters for the wall from a database and instructions for retrieving information about at least one prefabricated component from a component library. The instructions may further include instructions for preparing a three-dimensional model of the wall using the two-dimensional path and the parameters for the wall, such that the three-dimensional model includes the information about the at least one prefabricated component. The instructions may further include instructions that cause the data processor to add the three-dimensional model of the wall to a model of a building.

An embodiment of the invention includes a system for preparing a three-dimensional model of a building. The system may include a computer having a processor; and a memory disposed in communication with the processor. Executable instructions, may be stored in the memory, including instructions for receiving an indication from a user for a two-dimensional path for a wall. The instructions may further include instructions for retrieving parameters for the wall from a database; and retrieving information about at least one prefabricated component from a component library. The instructions may also include preparing a three-dimensional model of the wall using the two-dimensional path and the parameters for the wall, wherein the three-dimensional model include the information about the at least one prefabricated component. The instructions may finally include adding the three-dimensional model of the wall to a model of a building.

Figure 6:
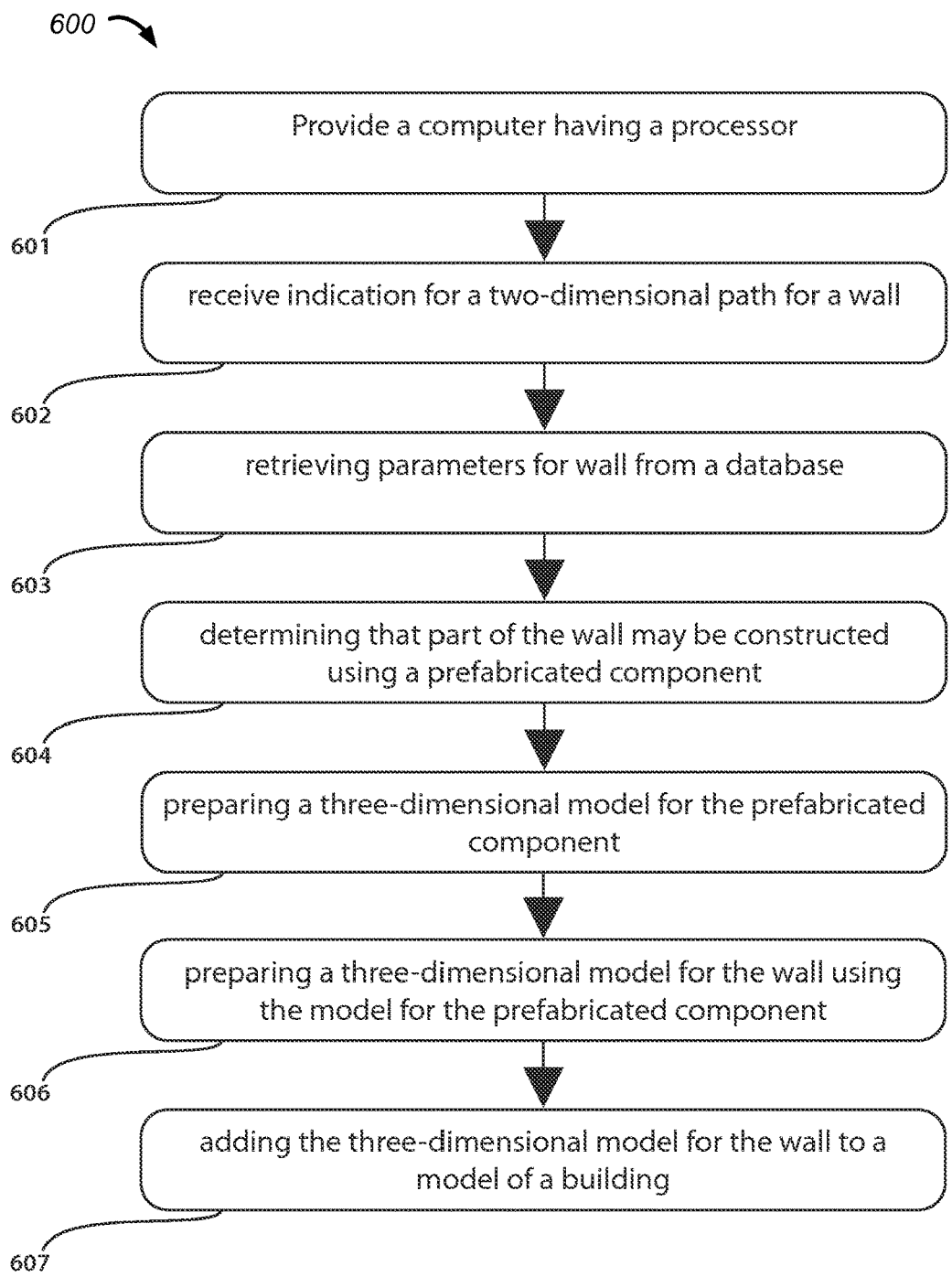
FIG. 6 is a high-level flowchart illustrating a method for generating a three dimensional model of a building according to an embodiment of the invention.

FIG. 6 is a simplified flowchart illustrating a method for generating a three-dimensional model of a building according to an embodiment of the present invention. The method 600 includes providing a computer having a processor (601); receiving an indication for a two dimensional path for a wall (602); retrieving parameters for the wall from a database (603); and determining that part of the wall may be constructed using a prefabricated component (604). The method further includes preparing a three dimensional model for the prefabricated component (605) and preparing a three dimensional model for the wall using the model for the prefabricated component (606). Furthermore, the method includes adding the three dimensional model for the wall to a model of a building (607).

It should be appreciated that the specific steps illustrated in FIG. 6 provide a particular method for generating a three-dimensional model of a building. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
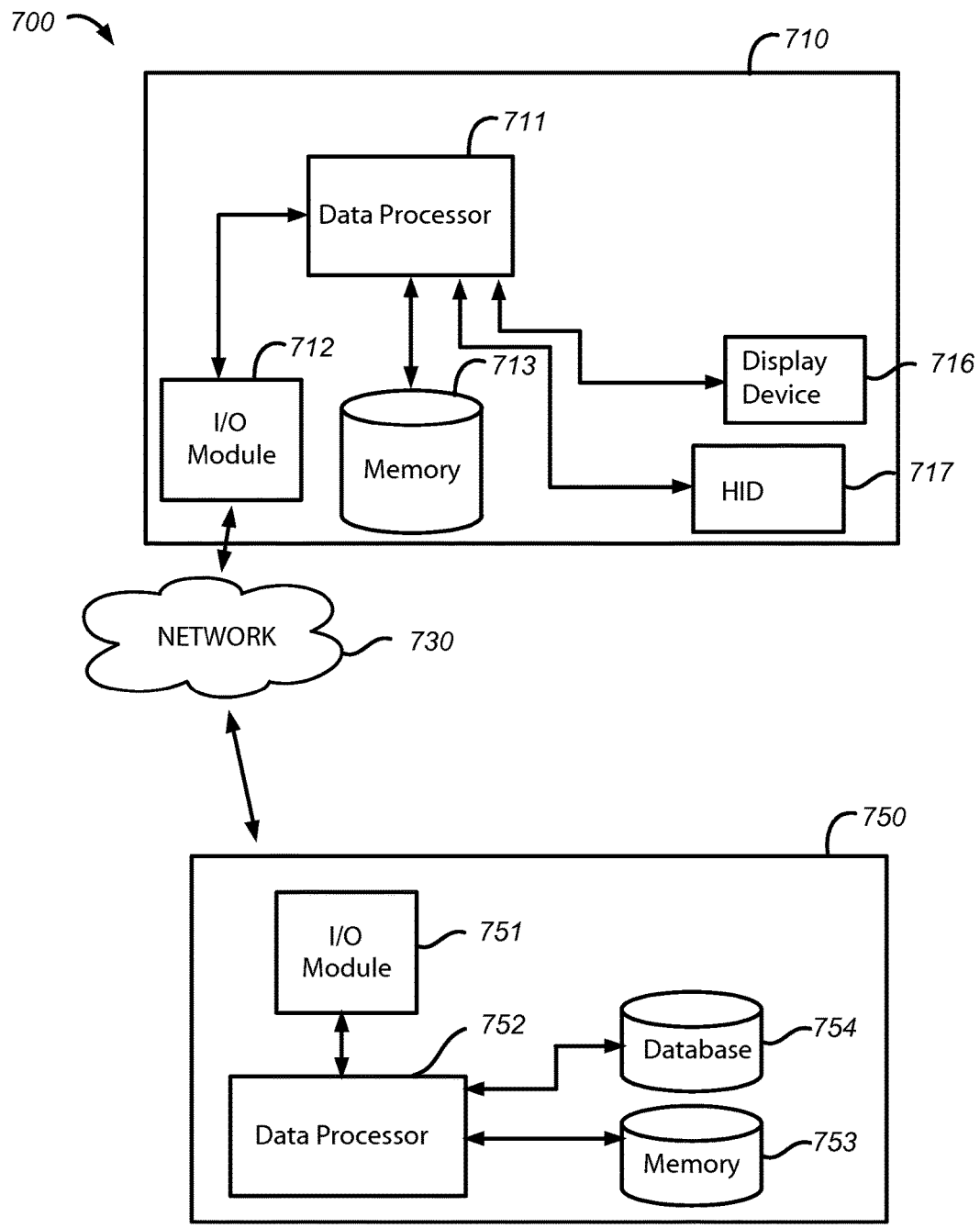
FIG. 7 is a high-level schematic diagram illustrating a system for generating a three dimensional model of a building according to an embodiment of the present invention.

FIG. 7 is a simplified schematic diagram of a system for generating a three-dimensional model of a building according to an embodiment of the present invention. The computer 710 can include one of many types of computing devices including, without limitation, a personal computer, a laptop computer, a notebook computer, a tablet computer, a handheld mobile device, a FDA, a mobile phone, or the like. As illustrated in FIG. 7, the computer 710 includes a data processor 711 and a memory 713. The computer further includes a display device 716 and a human interface device (HID) 717. The computer also includes an I/O module 712 that may be used to communicate over a network 730 with a computer (750) including a database 754. There 115 may be one or more such computers with databases. The second computer also includes a data processor 752, a memory 753 and an I/O module 751.

Figure 8:
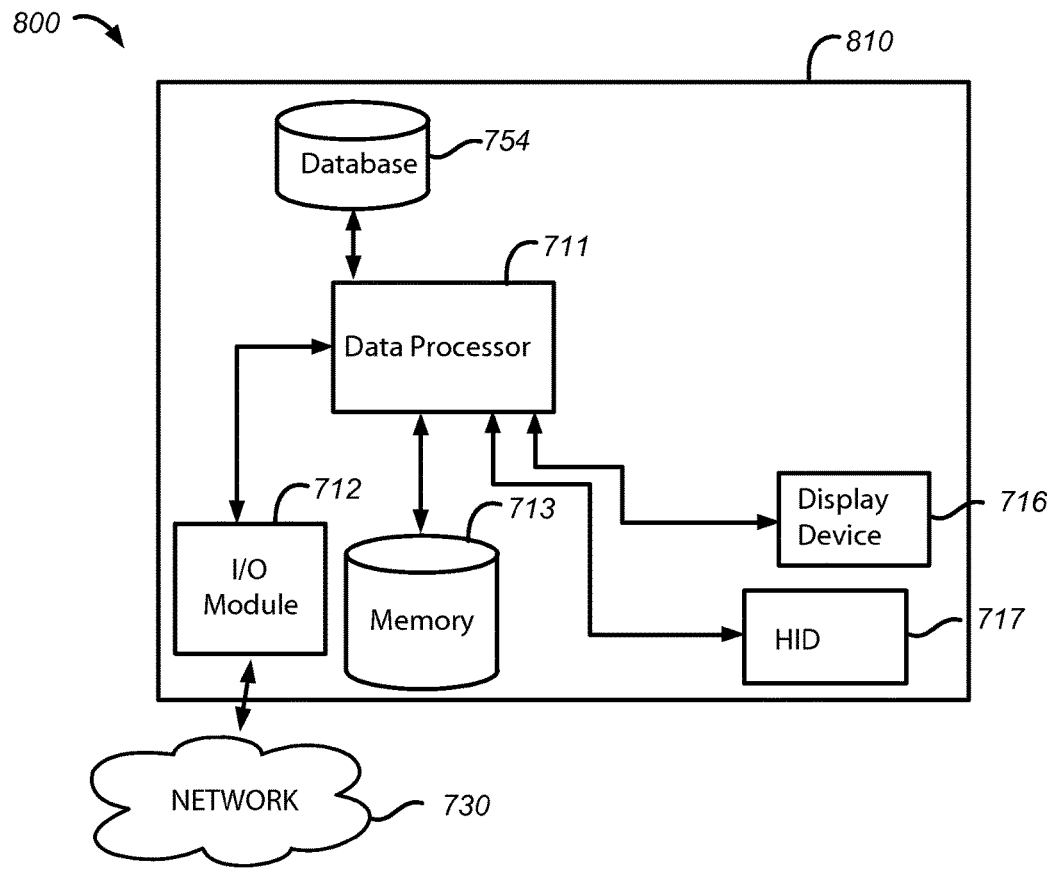
FIG. 8 is a high-level schematic diagram illustrating a system for generating a three dimensional model of a building according to an embodiment of the present invention.

FIG. 8 is a simplified schematic diagram of a system for generating a three-dimensional model of a building according to an embodiment of the present invention. The computer 810 can include one of many types of computing devices including, without limitation, a personal computer, a laptop computer, a notebook computer, a tablet computer, a handheld mobile device, a FDA, a mobile phone, or the like. As illustrated in FIG. 8, the computer 810 includes a data processor 711, and a memory 713. The computer further includes a display device 716 and a human interface device (HID) 717. The computer 810 also includes a database 754. The computer may also include an I/O module 712 that may be used to communicate over a network 730.

The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood b those within the art that each function and/or operation within such block diagrams, flowcharts, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and therefore, the appended claims are to encompass within their scope all such changes and modifications as are within the true spirit and scope of the subject matter described herein.

What is claimed is:

1. A method for updating a three-dimensional model of a building comprising:
   providing a processor;
   receiving the three-dimensional model of the building;
   receiving, in relation to the three-dimensional model of the building, an indication from a user for a two-dimensional path for a wall;
   retrieving parameters for the wall from a database, wherein the parameters include one or more of: wall thickness, wall height, wall materials, and insulation type;
   determining a subset of prefabricated wall elements from a prefabricated component library, wherein the subset of prefabricated wall elements is compatible with a first part of the two-dimensional path and the parameters for the wall;
   selecting a prefabricated wall element from the subset of prefabricated wall elements;
   determining a second part of the two-dimensional path is not constructed using the subset of prefabricated wall elements;
   thereafter, generating a new prefabricated wall element compatible with the second part of the two-dimensional path and the parameters for the wall;
   preparing, using the parameters for the wall and the two-dimensional path for the wall, a model for the prefabricated wall element and the new prefabricated wall element for use in construction of the wall;
   preparing, using the processor, a three-dimensional model of the wall using the two-dimensional path, the parameters for the wall and the model for the prefabricated wall element and the new prefabricated wall element;
   adding the three-dimensional model of the wall to the three-dimensional model of the building; and
   fabricating the prefabricated wall element and the new prefabricated wall element to form a building structure.

2. The method of claim 1 wherein preparing the three-dimensional model of the wall comprises ensuring that there are no conflicts between mechanical electrical and plumbing (MEP) components and studs.

3. The method of claim 1 further comprising receiving parameters for the wall from the three-dimensional model of the building, and coordinating mechanical electrical and plumbing (MEP) components in the wall with MEP components in the model of the building.

4. The method of claim 1 wherein preparing the model for the prefabricated wall element further comprises preparing models of mechanical electrical and plumbing components inside the prefabricated component.

5. The method of claim 1 wherein preparing the three-dimensional model of the wall further comprises preparing models of electrical wiring inside the wall.

6. The method of claim 1 wherein preparing the three-dimensional model of the wall further comprises preparing models of electrical outlets and air vents.

7. The method of claim 1 wherein selecting the prefabricated wall element is performed based on a weight assigned to one or more wall elements.

8. A method for generating a three-dimensional model of a building comprising:
   providing a processor;

receiving an indication from a user for a two-dimensional path for a wall;
retrieving parameters for the wall from a database, wherein the parameters include one or more of: wall thickness, wall height, wall materials and insulation type;
determining a subset of prefabricated wall elements from a prefabricated component library, wherein the subset of prefabricated wall elements is compatible with a first part of the two-dimensional path and the parameters for the wall;
selecting a prefabricated wall element from the subset of prefabricated wall elements;
retrieving from the prefabricated component library, a model for the prefabricated wall element for use in construction of the wall;
determining a second part of the two-dimensional path is not constructed using the subset of prefabricated wall elements;
thereafter, generating a new prefabricated wall element compatible with the second part of the two-dimensional path and the parameters for the wall;
generating a new model for the new prefabricated wall element for use in construction of the wall;
preparing, using the processor, a three-dimensional model of the wall using the two-dimensional path, the parameters for the wall, the new model for the new prefabricated wall element, and the model for the prefabricated wall element;
adding the three-dimensional model of the wall to the three-dimensional model of the building; and
fabricating the prefabricated wall element and the new prefabricated wall element to form a building structure.

9. The method of claim 8 wherein preparing the three-dimensional model of the wall comprises ensuring that there are no conflicts between mechanical electrical and plumbing (MEP) components and studs.

10. The method of claim 8 receiving parameters for the wall from the three-dimensional model of the building, and coordinating mechanical electrical and plumbing (MEP) components in the wall with MEP components in the three-dimensional model of the building.

11. The method of claim 8 wherein preparing the three-dimensional model of the wall further comprises preparing models of mechanical electrical and plumbing components inside the wall.

12. The method of claim 8 wherein preparing the three-dimensional model of the wall further comprises preparing models of electrical wiring inside the wall.

13. The method of claim 8 wherein preparing the three-dimensional model of the wall further comprises preparing models of electrical outlets and air vents.

14. The method of claim 8 wherein selecting the prefabricated wall element is performed based on a weight assigned to one or more wall elements.

* * * * *